United States Patent

Osterday et al.

[11] Patent Number: 5,185,915
[45] Date of Patent: Feb. 16, 1993

[54] PNEUMATIC BOOSTER OUTPUT ROD ADJUSTMENT METHOD

[75] Inventors: Craig A. Osterday; Douglas L. Osterfeld, both of Dayton; Thomas R. Baumaster, Springboro; Timothy M. Welch, Dayton; Michael P. Trego, Centerville; Donald M. Flory, Arcanum, all of Ohio

[73] Assignee: General Motors Corporation, Detroit, Mich.

[21] Appl. No.: 874,457

[22] Filed: Apr. 27, 1992

[51] Int. Cl.⁵ .............................................. B23P 19/02
[52] U.S. Cl. ...................................... 29/525; 408/1 R; 408/96
[58] Field of Search ................. 29/505, 525, DIG. 67; 303/113; 408/1 R, 95, 96

[56] References Cited

U.S. PATENT DOCUMENTS

| | | | |
|---|---|---|---|
| 2,560,951 | 7/1951 | Henderson et al. | 29/505 |
| 4,606,103 | 8/1986 | Koehl et al. | 29/525 X |
| 4,794,894 | 1/1989 | Gill | 29/525 X |
| 4,819,525 | 4/1989 | Rabe | 408/1 R X |

Primary Examiner—Timothy V. Eley
Assistant Examiner—C. Richard Martin
Attorney, Agent, or Firm—Ernest E. Helms

[57] ABSTRACT

A method of adjusting the length of a vehicle brake booster output rod and assembling the same into the brake booster is provided, the output rod being a thermoplastic or thermoset material that is generally cylindrical in shape with a central longitudinal bore with an axial stop means, and the output rod having an insertable button having a head with an attached stem, the booster having a housing with a central opening surrounding the output rod with a surrounding first formed surface for mounting a master cylinder, the method including piloting a cutting tool by inserting an elongated member into the bore of the output rod, orienting the cutting tool by mating a fixture locationally associated with the cutting tool on the first formed surface of the vacuum booster housing, preloading the output rod with the elongated rod by contacting means with the elongated rod to simulate a spring load of a master cylinder, cutting the output rod with the cutting tool to the correct dimension, removing the elongated member from the output rod bore, and inserting the stem of the button into the output rod with a sheet material juxtaposed between the stem and the bore of the output rod causing an interference fit retaining the button into the output rod bore.

4 Claims, 2 Drawing Sheets

PNEUMATIC BOOSTER OUTPUT ROD ADJUSTMENT METHOD

FIELD OF THE INVENTION

The field of the present invention is that of methods of adjusting the lengths of output rods on vehicle brake boosters. Although the present invention can be used on a plurality of types of brake boosters, particularly pneumatic or vacuum-type boosters, in the present application the present invention will be explained in the embodiment of the vacuum powered brake booster.

DISCLOSURE STATEMENT

Engine manifold vacuum-actuated brake boosters are well known, having been used in automotive vehicles for many years. Essentially they comprise a booster housing having a power piston which is axially movable by differential pressure. The power piston is connected with at least one diaphragm. The diaphragm separates the booster housing into a vacuum chamber and variable pressure chamber. A power piston-mounted valve mechanism actuated by a rod operatively associated with a brake pedal allows the vehicle operator to selectively connect the variable pressure chamber with the vacuum chamber or the atmosphere to create the differential pressure to move the power piston.

The booster has a rear end which is attached typically to a vehicle fire wall and a front end which is mated with a master cylinder. Booster housings are typically fabricated from stamping and, therefore, the length of the booster housing will vary from booster to booster. The force generated in the booster is transmitted to the master cylinder by an output rod which is captured between the power piston and the piston of the master cylinder. Since the housing dimensions vary, a method of adjustment in the length of the output rod must be provided. Too long of an output rod will cause the master cylinder to be shifted to an activated position when the vehicle brake pedal is not being operated by the vehicle operator. Too short of an output rod will bring upon a requirement for additional travel of the brake pedal before the master cylinder is activated, increasing what is commonly referred to as "dead time" travel, which makes the vehicle brakes take longer to operate.

Prior to the present invention there existed several methods to adjust the length of the output rod. One method of adjustment was to measure the required length of the output rod using a surface of the booster housing which mates with the master cylinder as the datum point. A two-piece output rod was then provided having a standard cup member combined with selected insertable members (there being several such members available of various lengths) to provide an output rod of the required length.

A second method was to provide a two-piece output rod wherein the insertable member was threadably inserted and, therefore, by rotation the threaded member would achieve the degree of insertion necessary to provide the output rod of the correct length.

The first method typically required the output rod length adjustment to be made on the assembly line if it was desirable to ship the boosters and master cylinders separately to a vehicle assembly operation.

If output rod adjustment was also undesirable at the assembly plant, the master cylinder and booster would have to be mated at their point of manufacture and thereafter shipped in the mated condition to the vehicle assembly operation. Shipment of the booster and master cylinder in the mated condition is typically more expensive.

Furthermore, to meet the environmentally mandated goal of decreasing vehicle weight, more and more components of the booster have been converted to polymeric materials instead of metallic materials. Therefore, it is desirable to make output rods of a nonmetallic material. However, utilization of a nonmetallic output rod provided special problems in relation to the prior methods of output rod adjustment.

SUMMARY OF THE INVENTION

To overcome the above-noted problems and to provide an improvement of the environment resultant from decreased vehicle weight, the present invention is brought forth. The present invention involves a method of output rod length adjustment of a brake booster output rod which is manufactured from a thermoplastic material during the assembly process of the booster, before assembly into the vehicle.

The present novel method of adjustment provides a thermoplastic output rod having a metallic button. The output rod is machined to the proper dimension after assembly into the booster, and thereafter the button is attached to the output rod utilizing a polymer sheet material juxtaposed therebetween to provide an interference to retain the button to the output rod. Therefore, shipment of the booster can be separate from shipment of the master cylinder, and premating of the booster and master cylinder is not required. Utilization of the novel inventive method of output rod adjustment allows the brake booster to be assembled and manufactured separately from the vehicle master cylinder, and therefore adjustment upon the vehicle assembly line is eliminated.

DETAILED DESCRIPTION OF THE INVENTION

Figure 1:
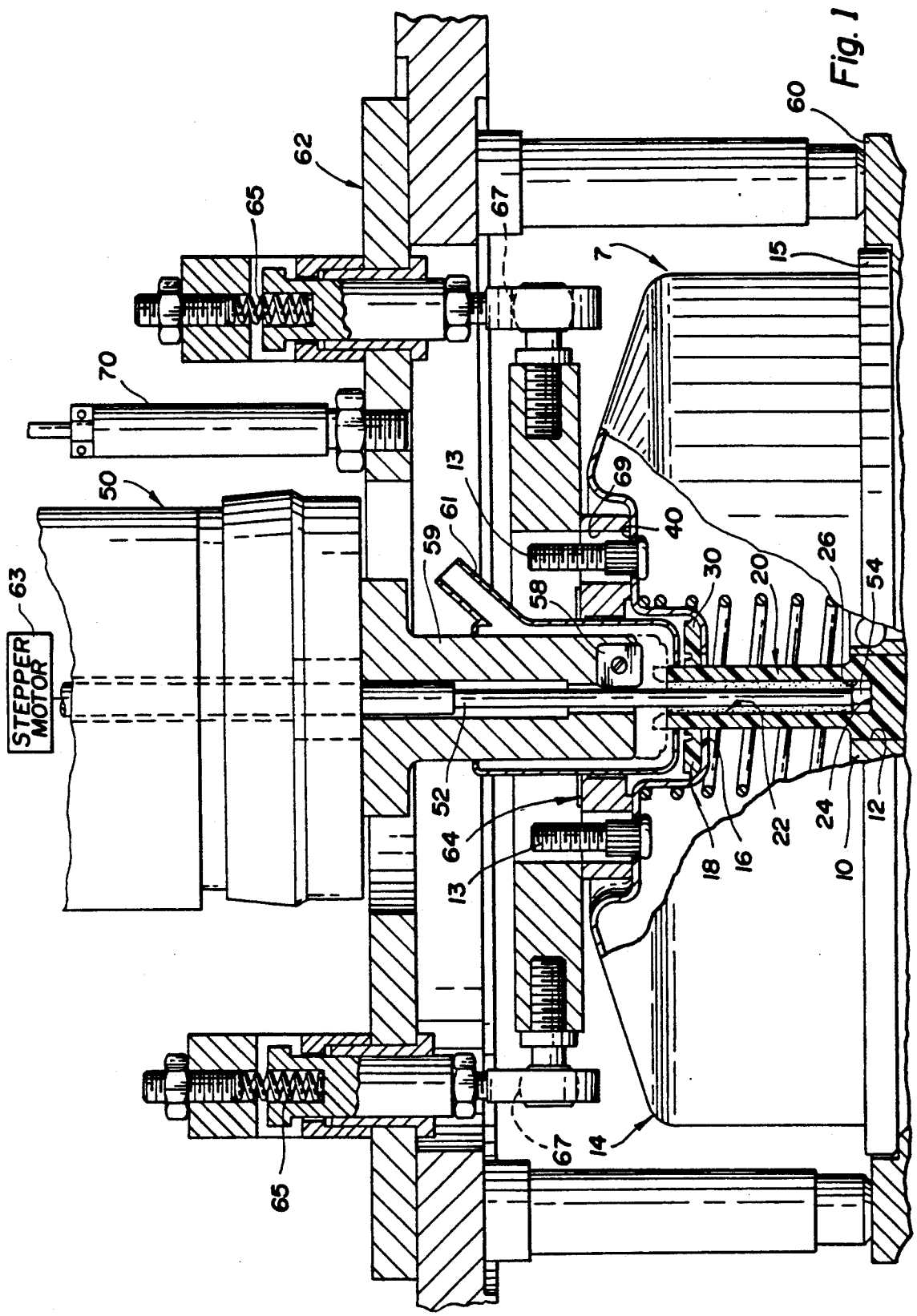
FIG. 1 is a sectional view of the adjusting and machining operation of the push rod utilizing the present inventive method.
Figure 2:
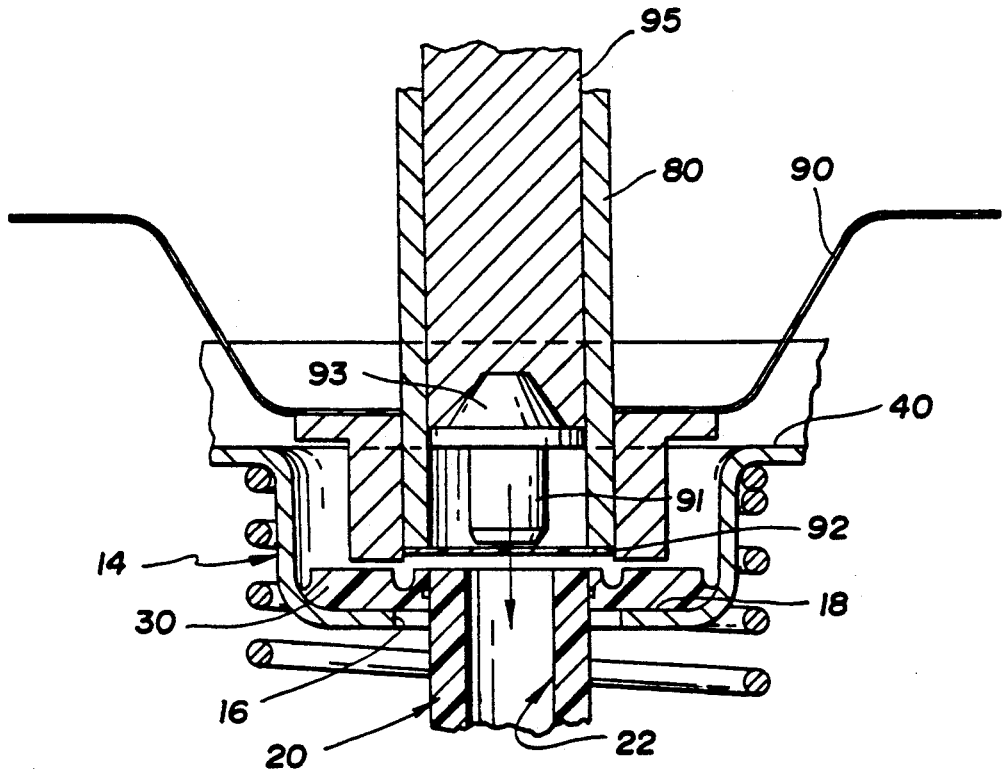
FIGS. 2 and 3 are sectional views illustrating the installation of the button to the end of the output rod.
Figure 3:
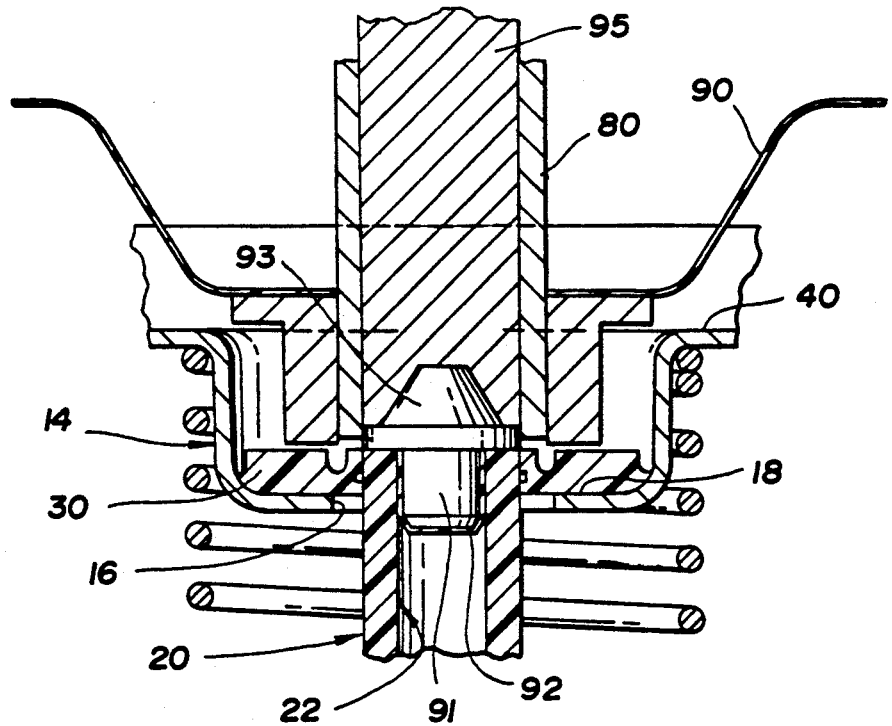

Referring to FIGS. 1 and 2, there is illustrated a dual tandem vehicle brake vacuum booster 7. The booster illustrated is similar to that claimed and described in co-pending U.S. Ser. No. 07/692,888 filed Apr. 29, 1991, the disclosure of which is incorporated by reference herein. Mounted within the opening 16 of the booster 7 is an output rod 20. The output rod 20 is generally cylindrical in shape with an enlarged diameter which fits within a cylindrical-shaped aperture 12 power piston 10.

The output rod is an elongated member and has a central longitudinal bore 22 with an axial stop means provided by a blind end 24 on an end of the output rod 20 toward the power piston 10. Additionally, the longitudinal bore 22 has a polygonal faced cylindrical wall 26 end toward the blind end. The output rod 20 is usually a thermoplastic or thermoset material which is capable of withstanding high pressures.

The output rod protrudes through an opening 16 in a front housing 14 of the booster. The booster front housing 14 opening has a surrounding flat surface 18 generally perpendicular to the output rod for placement of an elastomeric seal 30 to seal the output rod 20. Radially outward and forward from the second surface 18 is a first mounting surface 40 for mounting of a master cylinder (not shown) which is typically generally perpendicular to the output rod 20.

To effectuate the adjustment of the output rod's length, a rotating cutter spindle 50 is typically hung downwards. The front end of the booster housing is typically placed to face upward with a rear 15 portion of the booster housing being set on a locator plate 60. The rotating cutter spindle 50 has an elongated member 52 with a polygonal head 54 for insertion within the bore of the output rod. The elongated member is oriented by cutting tool 59 with a diamond insert 58 which is used to machine off the end of the output rod 20. The elongated member 52 by gravity places a 15-pound preload on the output rod to simulate a return spring of a master cylinder. The elongated member 52 pilots the output rod 20 into position.

The fixture 62 has an axially floating locator plate 64 which makes contact with the master cylinder mounting surface 40 of the booster front housing. The floating locator plate 64 is suspended (in a downward biased direction) by springs 65 along an axis parallel to the output rod 20. Along a line perpendicular to the longitudinal axis of the output rod, the floating 64 locator plate has rotary motion by virtue of spherical pins 67. The floating locator plate 64 also has openings 69 to allow passage of housing bolts 13. A laser distance gauge 70 is provided which determines the distance traveled by the floating locator plate 64 to engage with the second surface 40. The laser distance gauge 70 then feeds the distance information to a controller (not shown) associated with the rotary cutter spindle 50 which is powered in an axial direction toward the output rod 20 by a stepper motor 63. The output rod 20 is then machined in position.

The polygonal head 54 of the elongated member 40 mates with the output rod's bore polygonal wall 26 to prevent the output rod 20 from being rotated by the cutting head 59. Cuttings are confined by a dust cover 61, and a suitable vacuum system (not shown) removes the cuttings to prevent any contamination to the booster 7 by foreign material. The elongated rod is removed, and the booster is then removed from the fixture.

Referring to FIG. 2, a two-piece punch die 80 cuts a circular blank 92 of polymer sheet material 90 typically of the same diameter of the reduced diameter portion of the output rod (the diameter adjacent to the elastomeric seal). The blanked sheet material, which is typically a polyester film such as Mylar, is placed over the output rod bore 22. A stem of a metallic button 93 is then inserted by a press rod 95 into the output rod bore, and the polymeric sheet material juxtaposed in between causes an interference which retains the button 93 within the output rod bore. The above retention is critical during the shipment of the booster fabrication to the assembly plant location for assembly to the vehicle.

The output rod button is made to a tight tolerance utilizing a cold heading process or similar type operation which can hold tight tolerances. The button is common for all booster vehicle applications. The variations in the actual location in the booster/master cylinder interface is accounted for by the adjusted length of the output rod 20.

While an embodiment of the present invention has been explained, it would be readily apparent to those skilled in the art of the various modifications which can be made to the present invention without departing from the spirit and scope of this modification as it is encompassed from the following claims.

The embodiments of the invention in which an exclusive property or privilege is claimed are defined as follows:

1. A method of adjusting the length of a vehicle brake booster output rod and assembling the same into a brake booster, the output rod being formed of a thermoplastic or thermoset material that is generally cylindrical in shape with a central longitudinal bore with an axial stop means, and the output rod having an insertable button having a head with an attached stem, the booster having a housing with a central opening surrounding the output rod with a surrounding first formed surface for mounting a master cylinder, the method in combination comprising:

piloting a cutting tool by inserting an elongated member into the bore of the output rod;

orienting the cutting tool by mating a fixture locationally associated with the cutting tool on the first formed surface of the vacuum booster housing;

preloading the output rod with the elongated member by contacting means with the elongated member to simulate a spring load of a master cylinder;

cutting the output rod with the cutting tool to a desired dimension corresponding to dimensions of the booster housing;

removing the elongated member from the output rod bore;

inserting the stem of the button into the output rod with a sheet material juxtaposed between the stem and the bore of the output rod causing an interference fit retaining the button in the output rod bore.

2. A method as described in claim 1 wherein the bore of the output rod is covered with the sheet material before the stem of the button is inserted into the bore of the output rod.

3. A method as described in claim 2 wherein the sheet material utilized is a polymeric plastic material.

4. A method as described in claim 1 further including the elongated member having an end for torsional restraint of the output rod to restrain the output rod from rotating when being machined by the cutting tool.

* * * * *